US008284675B2

(12) United States Patent
Ansari et al.

(10) Patent No.: US 8,284,675 B2
(45) Date of Patent: Oct. 9, 2012

(54) METHOD AND SYSTEM FOR AUTOMATED CALL TROUBLESHOOTING AND RESOLUTION

(75) Inventors: Zubair Ansari, Santa Clara, CA (US); Walter Scott Tester, San Francisco, CA (US); Amy Pendleton, Dallas, TX (US); Ravishankar Palaparthi, San Jose, CA (US); Jenny Li, Santa Clara, CA (US); Parama Ghosh, Sunnyvale, CA (US)

(73) Assignee: Rockstar Bidco, L.P., New York, NY (US)

( * ) Notice: Subject to any disclaimer, the term of this patent is extended or adjusted under 35 U.S.C. 154(b) by 775 days.

(21) Appl. No.: 11/476,299

(22) Filed: Jun. 28, 2006

(65) Prior Publication Data
US 2008/0037443 A1 Feb. 14, 2008

(51) Int. Cl.
*G08C 15/00* (2006.01)
(52) U.S. Cl. ......... 370/241; 370/254; 370/252; 370/351
(58) Field of Classification Search .................. 370/252; 707/6; 379/32.03
See application file for complete search history.

(56) References Cited

U.S. PATENT DOCUMENTS

| | | | | |
|---|---|---|---|---|
| 5,802,146 | A * | 9/1998 | Dulman | 379/32.03 |
| 6,741,569 | B1 * | 5/2004 | Clark | 370/252 |
| 6,920,453 | B2 * | 7/2005 | Mannila et al. | 707/6 |
| 7,551,922 | B2 * | 6/2009 | Roskowski et al. | 455/423 |
| 2004/0210654 | A1 * | 10/2004 | Hrastar | 709/224 |
| 2006/0203738 | A1 * | 9/2006 | Fok et al. | 370/252 |
| 2006/0233114 | A1 * | 10/2006 | Alam et al. | 370/252 |
| 2007/0248012 | A1 * | 10/2007 | Glinsman et al. | 370/232 |

OTHER PUBLICATIONS

A. Jonhston, H. Sinnreich, A. Clark, A Pendleton, "RCTP Summary Report Delivery to Third Parties", Sipping Working Unit, Feb. 15, 2004, pp. 1-17.*

* cited by examiner

Primary Examiner — Rafael Pérez-Gutiérrez
Assistant Examiner — German Viana Di Prisco
(74) Attorney, Agent, or Firm — Christopher & Weisberg, P.A.

(57) ABSTRACT

A method and apparatus for call quality troubleshooting and mitigation may include polling network communication path elements to determine network performance data, receiving a call quality alert from at least one communication unit, the call quality alert indicating degraded call quality of a call session, and analyzing the network performance data from the network communication path elements and the at least one communication unit to determine a cause of the alert and at least one action to mitigate the cause of the alert. The apparatus for call quality troubleshooting and mitigation may include a memory for storing data from network communication path elements and data from at least one communication unit, and a processor operating to poll network communication path elements to determine network performance data, to store a call quality alert received from at least one communication unit in the memory, and to the network performance data from the network communication path elements and the at least one communication unit to determine a cause of the alert and at least one action to mitigate the cause of the alert. The method and apparatus may further include correlating the data from the network communication path elements with the data from the at least one communication unit and invoking a real-time network topology investigation module to determine the cause of the call quality alert.

23 Claims, 3 Drawing Sheets

METHOD AND SYSTEM FOR AUTOMATED CALL TROUBLESHOOTING AND RESOLUTION

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to communication networks and more particularly, to a method and system that provide for automated audio and video call quality troubleshooting and resolution.

BACKGROUND OF THE INVENTION

Enterprises of all sizes are expanding Internet Protocol ("IP") telephony and IP video deployments such that what is traditionally thought of as separate voice, video and data networks are converging to run over an IP infrastructure. Even though voice and video are sometimes characterized as just other applications, the fundamental aspects of voice/video conversations place requirements on the network that are quite different from data applications. These requirements amount to providing toll quality voice (and video), which is measured in terms of clarity and delay. Unlike data applications in which automatic retransmissions of erred data is expected and easily handled, there are no second chances with voice (and video).

In general, IP does not provide a mechanism to ensure that data packets are delivered in sequential order, or provide Quality of Service ("QoS") guarantees, so Voice over IP ("VoIP") and video over IP (also referred to as "IP streaming video") implementations face problems dealing with latency, packet loss, and jitter. One type of latency problem resulting in network degradation is "absolute" or "fixed" delay that can cause a perceived loss of voice/video quality. A wide range of factors contribute to fixed delay including encoding delay from the chosen codec algorithm, switching time for each individual packet (also known as packet time), propagation time in the network and delay from optional encryption, intrusion detection filtering and similar processes.

Packet loss can be viewed as an extreme case of delay where the packets are so severely delayed that they never arrive. For example, if a network failure occurs, packets may be lost during the time that traffic is rerouted onto alternate facilities or for some OSI layer 2 protocols such as frame relay, Asynchronous Transfer Mode ("ATM") and Multiprotocol Label Switching ("MPLS"), errant packets are detected and discarded.

Packet jitter is used to describe the difference between the longest delay and the shortest delay in the delivery of packets traversing the network, link or pathway during a predetermined period of time. Sometimes, packet jitter is used to describe the maximum delay difference between two consecutive packets in some period of time. For most data applications, this has a minor impact, as data protocols are designed to collect information and to transmit and receive this information whenever it is available. As long as each packet arrives intact, the timing between packets is of relatively minor importance. This is referred to as asynchronous transmission—there is no fixed relationship between the timing at the sending and the receiving end. Voice/video is quite different, as it is a synchronous service—which requires a more precise delay relationship between the source and the recipient of the information.

Additional supported voice and video problems include echo, one way voice path, gaps in speech and distorted/choppy voice/video. The above described problems may be caused by duplex mismatch, blocked IP packets (due to firewall or network address translation ("NAT")), congestion, low-speed link in path, fast pipe to slow pipe, route flapping and/or link failure.

Existing voice and video quality management solutions are manual and therefore time-consuming, laborious and prone to error. These solutions require two or more different applications for alerts and performance data to locate a problem cause and at least one more application to apply a needed corrective policy. In addition, it is nearly impossible for a network administrator to continuously monitor network traffic and also take corrective action in a high availability network environment. Therefore, a need exists for call quality management systems and methods that can monitor a network system, determine the likely cause of the problem, locate the actual source of the problem and perform most corrective actions in an automated fashion to solve the aforementioned problems.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

The present invention advantageously provides a method and system for call quality troubleshooting and resolution to increase overall system availability. The invention is based on monitoring network performance and using an analysis engine, such as a root-cause analysis (RCA) engine, to detect, correlate and automatically correct the voice and video quality issues.

In accordance with one aspect, the present invention provides a method for call quality troubleshooting and mitigation. The method for call quality troubleshooting and mitigation may include polling network communication path elements to determine network performance data, receiving a call quality alert from at least one communication unit, the call quality alert indicating degraded call quality of a call session, and analyzing the network performance data from the network communication path elements and at least one communication unit to determine a cause of the alert and at least one action to mitigate the cause of the alert. The method may further include correlating the data from the network communication path elements with the data from the at least one communication unit. The method may still further include invoking a real-time network topology investigation module to determine the cause of the call quality alert.

In accordance with another aspect, the present invention provides an apparatus for call quality troubleshooting and mitigation. The apparatus for call quality troubleshooting and mitigation may include a memory for storing data from network communication path elements and data from at least one communication unit, and a processor operating to poll network communication path elements to determine network performance data, to store a call quality alert received from at least one communication unit in the memory, and to the network performance data from the network communication path elements and at least one communication unit to determine a cause of the alert and at least one action to mitigate the cause of the alert. The processor may further operate to correlate the data from the network communication path elements with the data from the at least one communication unit. The processor may still further operate to invoke a real-time network topology investigation module to determine the cause of the call quality alert.

In accordance with still another aspect, the present invention provides a storage medium storing a computer program which when executed by a processing unit performs a method for call quality troubleshooting and mitigation that may include polling network communication path elements to determine network performance data, receiving a call quality alert from at least one communication unit, and invoking an analyzing routine to analyze data from the network communication path elements and the at least one communication unit.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

When used herein, the term "trap" is defined to mean a block of data conveyed over a protocol to convey a suboptimal condition and/or a change in condition on some network(s), service(s), device(s) and/or element(s).

Figure 1:
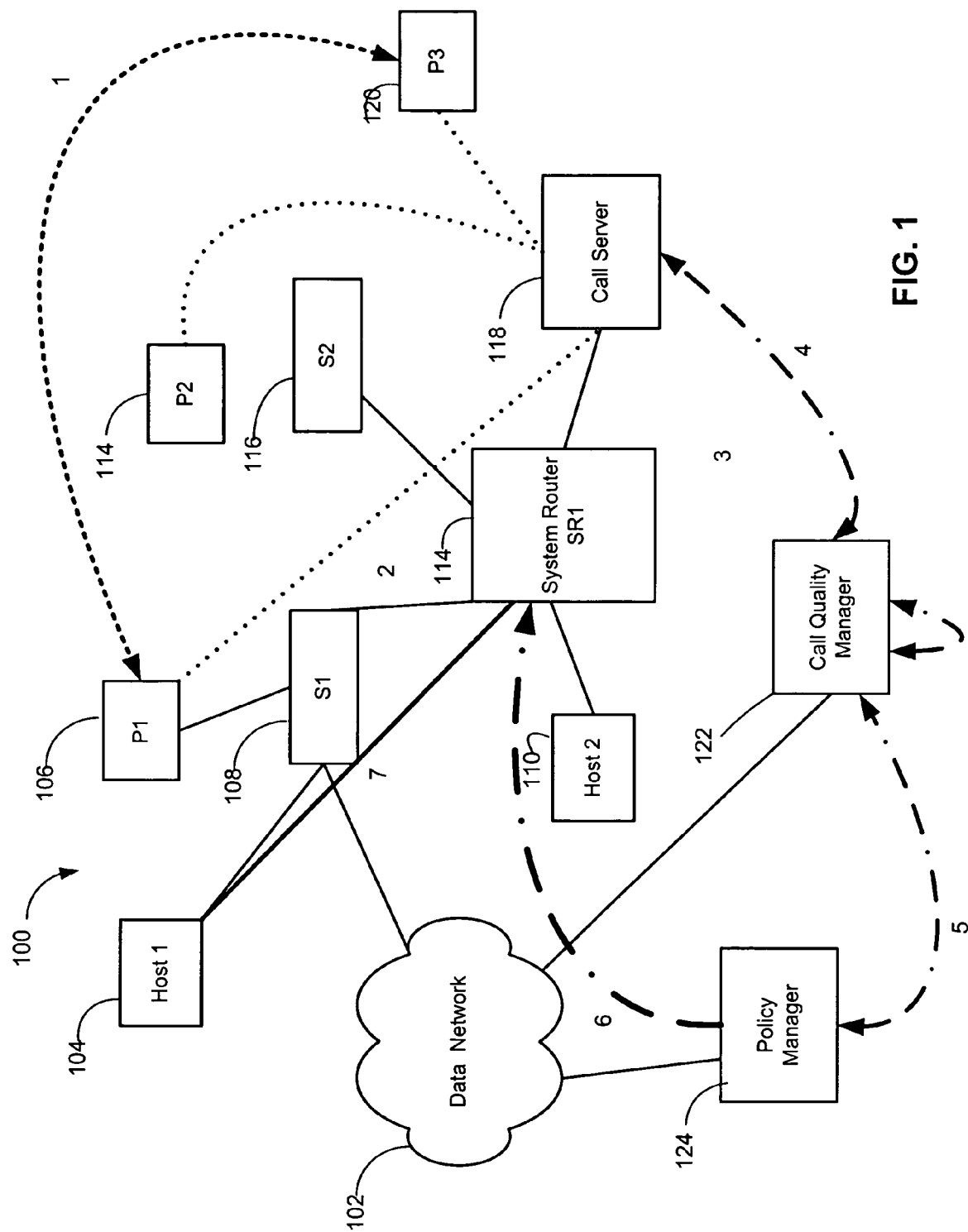
FIG. 1 is a block diagram of an exemplary communication network constructed in accordance with the principles of the present invention.

Referring now to the drawing figures in which like reference designators refer to like elements, there is shown in FIG. 1 a block diagram of a communication system constructed in accordance with the principles of the present invention designated generally by the numeral 100. Communication system 100 preferably includes a data network 102. The data network 102 can be any network having an addressing scheme of various address length and capable of performing the functions herein. For example, an IP routed data network that supports voice and video over IP. The data network 102 is in communication with one or more system switches 108, 116 and one or more system routers 114. Each of the routers 114 includes a central processing unit, volatile and non-volatile storage (memory) and wired and/or wireless communication sections, which can receive and/or transmit, wired and/or wireless communication data to and/or from data network 102 and any network device. The call server 118 provides the communication units 106, 114 and 120 with voice and video communication services.

The communication units 106, 114 and 120 can include IP phones, video phones and software phones that are implemented via software on a PC, PDA or other computing devices, and/or could be a standard digital phone or even an analog phone connected to an IP-enabled private branch exchange ("PBX") or to an IP telephony-enabled router/gateway. The call quality manager 122 of the current invention is coupled to the data network 102 and monitors the communication pathways of the data network 102. The call quality manager 122 may be installed on a computer or packaged in a hardware appliance, for example a server, switch or router. The call quality manager 122 additionally provides the capability to scan the network to discover network devices, elements, links, etc. to determine the network's topology and create an internal map and/or internal mapping for use in later troubleshooting and repair. In addition, the call quality manager 122 can generate an internal event reference when it discovers that a certain condition has occurred on one or more pathways or links of the network.

Figure 2:
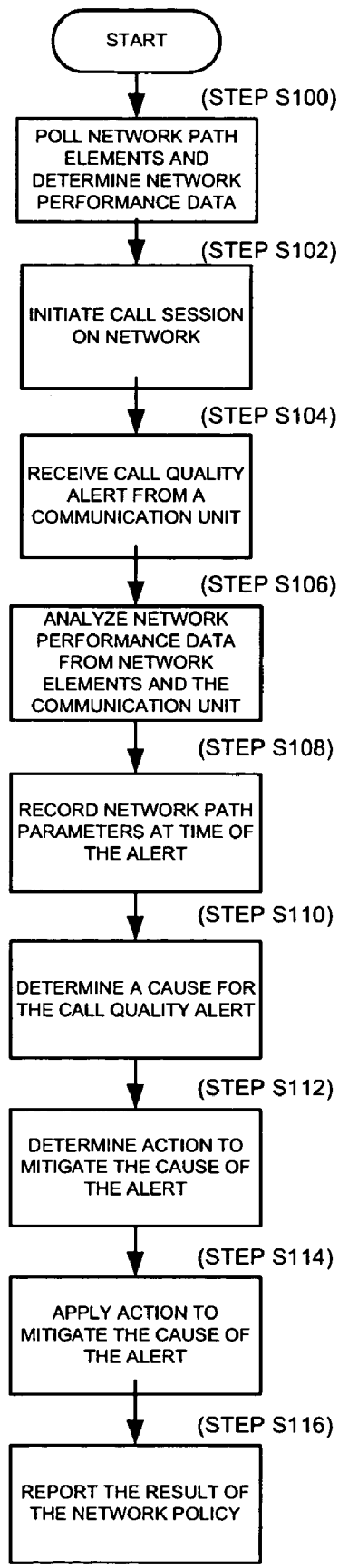
FIG. 2 is a flowchart of a process for call quality troubleshooting and mitigation in accordance with the principles of the present invention.

FIG. 2 is a flowchart of the process for call quality troubleshooting and mitigation. As shown in FIG. 2, a call quality manager 122 can poll and receive availability status and/or network performance data (e.g., real-time transport control protocol extended reports ("RTCP-XR") stats) from the network devices via step S100. After a call is initiated (step S102), the call quality manager 122 may receive an alert that call quality has been degraded during a call session, via step S104. The alert can be, for example, a simple network management protocol ("SNMP") trap (such as a RTCP-XR alert), which indicates a packet loss causing a degraded call quality. The RTCP-XR alert provides out-of-band control information for a real-time transport protocol ("RTP") flow. It partners with RTP in the delivery and packaging of multimedia data, but does not transport any data itself and is used periodically to transmit control packets to participants in a streaming multimedia session. The primary function of RTCP-XR is to provide feedback on the quality of service ("QoS") being provided by RTP.

In step S106, the call quality manager 122 can invoke a root cause analysis ("RCA") engine to evaluate a high traffic network alert and the RTCP-XR alert based on the topology information that was gathered, and then determine the correlation between the network topology data and the network alert data. At step S108, the call quality manager 122 provides the feature of recording the network path at the time of the problem (or taking a "snapshot") to ensure availability for analysis at a later time by the network administrator. The snapshot or recording can be stored in various storage locations including but not limited to a local hard drive, a database, an internal proprietary database, a smart card and/or memory stick, remote server storage, a memory block and a random access memory (RAM) disk. This snapshot feature is useful to network administrators because network paths typically keep changing and the actual network path at the time when the problem occurred may be different from when a network administrator is viewing the problem. In addition, even if the call quality manager 122 is unable to resolve the network problem, or if alternatively, the network alert was a false alert; the call quality manager 122 can still provide the snapshot feature to capture the network conditions under which the network alert was generated for later analysis.

Next, the call quality manager 122 can use a live topology investigation algorithm module to determine the cause of the call degradation, via step S110. For purposes of illustration, in this example, it is assumed that host 1 (104) was generating heavy data traffic on the link 2 between switch S1 (108) and system router SR1 (114) to host 2 (110). The call quality manager 122 can confirm that the call quality degradation was caused by the high traffic on the network element (e.g., link 2) and it can alert the network about potential ways for resolution by commencing a resolution phase (step S112). In this example, a network policy is requested for SR1-S1 link (see link 5) and the network policy is applied on the network element by the policy manager 124 (see link 6), via step S114. For example, the network policy for this embodiment may be to increase the priority of the voice/video data to insure no performance degrading packet delays.

In general, all traffic is treated equally on the communications network, but now the traffic is analyzed to determine if it should be received with a higher priority than some other data traffic. The resolution can be optionally implemented (see link 7) and the call quality manager 122 can optionally report the result of the network policy to the network administrator, via step S116. By following the above steps, the call quality manager 122 has effectively identified, isolated, and resolved a call quality issue automatically without the involvement of the network administrator.

Figure 3:
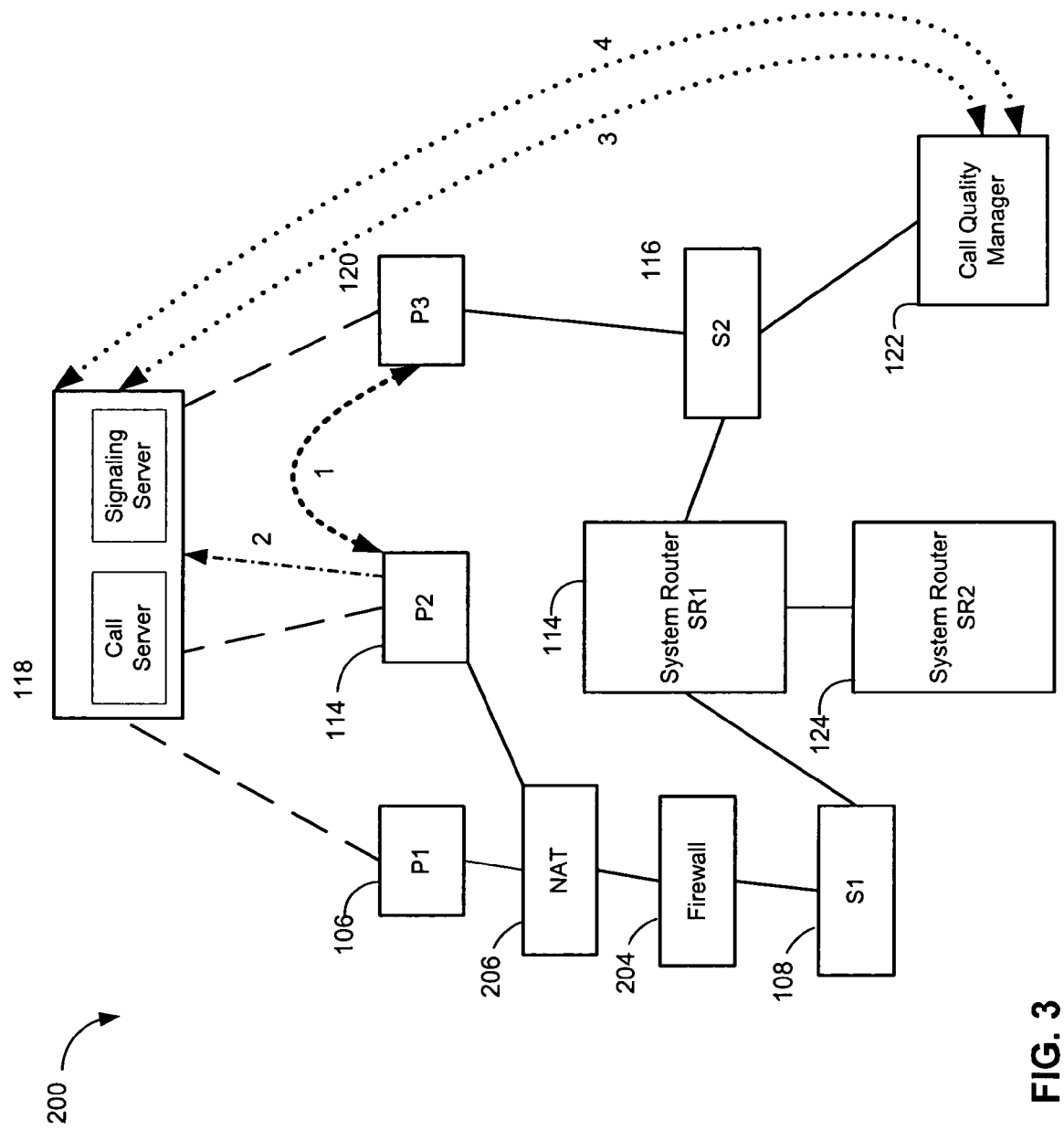
FIG. 3 is a block diagram of another exemplary communication network constructed in accordance with the principles of the present invention.

Another exemplary communication network 200 having a call quality manager 122 in accordance with the present invention is described with reference to FIG. 3. As is shown in FIG. 3, the network elements having the same designators as in FIG. 1 will also have the corresponding capabilities as described previously. Several specific supported call quality issues are discussed with respect to FIG. 3. The first example is where there is a packet loss caused by a faulty or defective firewall 204. In this embodiment, the firewall 204 is coupled between the two communication units 106, 114 and switch (S1) 108. Firewall 204 functions as a logical barrier designed to prevent unauthorized or unwanted communications between sections of the communication network 200. In this example, a call may be initiated between communication units 114 and 120, and the communication units 114, 120 may send RTCP-XR stats to the call quality manager 122. In additional, a network alert from the signaling server (SS1) 118 may be generated in which the SNMP R-value score ("RV1") has a burst density greater than six percent and a network loss rate greater than ten percent or a burst density greater than six percent, a network loss rate less than five percent and a discard rate less than one percent. The call quality manager 122 may invoke the RCA algorithm to correlate RV1 with its corresponding database path-trace. This analysis can verify that the firewall 204 is in the database path. If the firewall 204 is in the database path, then it may be tagged as the probable cause for the call quality alert (RV1). On the other hand, if the firewall 204 is not in the database path, then a live pathtrace between communication units 106 and 114 can be performed from one end to the other end. If the other end is not reachable, another pathtrace from the other end to the first end to determine the points of discontinuity. Regardless of whether a discontinuity is found or not, the call quality manager 122 may generate a recording of the network event and store it in a storage element.

In another example, a faulty or defective network address translator 206 causes a packet loss. The network address translator 206 provides network address translation ("NAT") and network address port translation ("NAPT"). In this embodiment, the firewall 204 is removed (or assumed to be functioning properly) and instead the two communication units 106, 114 have their addresses subject to NAT/NAPT. NAT involves re-writing the source and/or destination addresses of IP packets as they pass through a router, firewall or a standalone/integrated NAT device. Typically, NAT is used for one private IP to one public IP mapping. NAPT refers to network address translation involving the mapping of port numbers and provides for multiple machines to share a single IP address. In this example, a network alert from the signaling server (SS1) 118 may be generated in which the SNMP R-value score ("RV1") has a burst density greater than six percent and a network loss rate greater than ten percent or a burst density greater than six percent, a network loss rate less than five percent and a discard rate less than one percent. The call quality manager 122 can isolate the communication units (e.g., phones), which generated the alert/trap and then connect to the call server (CS) to access data to identify any phones behind the NAT(s), which match with the phones generating the trap. The call quality manager 122 can use the RCA algorithm to identify the possible NAT configuration and/or the faulty NAT operation as the root cause. The call quality manager 122 may generate a recording of the network event and store it in a storage element.

In another example, a packet loss is caused by a duplex mismatch. In this embodiment, the firewall 204 and the NAT are removed (or assumed to be functioning properly). Duplex mismatch occurs when the parity between two network elements is not matched resulting in some bits being lost, altered or misread. In this example, a call may be initiated between the communication units 114 and 120, and the communication units 114, 120 may send RTCP-XR stats to the call quality manager 122. In additional, a network alert from the signaling server (SS1) 118 may be generated in which the SNMP R-value score ("RV1") has a burst density greater than six percent and a network loss rate greater than ten percent. The call quality manager 122 may invoke the RCA algorithm to correlate RV1 with its corresponding database pathtrace and flag a duplex mismatch somewhere along the path as the possible cause. Please note that although FIG. 2 illustrates only four switch devices 108, 114, 116 and 124, there can be a series of these switch devices along a given path. When a duplex mismatch is found, the call quality manager 122 can modify the configuration on one/both of the network devices to equate the duplex/parity setting to resolve the problem and note the corrective action (e.g., changing from X to Y, such as "7E1 to 8N1"). If no duplex mismatch is found, the all quality manager 122 may perform a database pathtrace between the switches 108, 114, 116 and 124 to identify any "middle" switches and obtain the management information base ("MIB") values from the middle switches for a comparison. If a duplex mismatch is located, the call quality manager 122 may report the location of the relevant switches and their respective ports connect to these switches to correct their duplex settings and generate a report to document the corrections for the network event and store it in a storage element. If no duplex mismatch is located, then the call quality manager 122 may report that the root cause could not be determined.

In yet another example and referring back to FIG. 1, host 1 (104) may be transferring a large file to host 2 (110) over the data network 102. A call may be initiated between communication units 114 and 120 (located in zone 1, "Z1"), a network alert from the signaling server (SS1) 118 having zonal packet loss and jitter trap data is received by the call quality manager 122. The call quality manager 122 can lookup the OSI layer 2 ("L2") topology for the relevant zone from the database and obtain the percentage bandwidth utilization on the switches 108, 116 for the relevant interfaces. The call quality manager 122 can identify congested interfaces (e.g., those interfaces with a percentage bandwidth utilization is above a threshold value) and indicate that congestion is the root cause. The policy manager 124 can deploy its policies for packet loss and jitter, if the history of similar congestion is present or other factors based on the current network configuration. However, if there is a spike in traffic congestion but no history of similar congestion is present the step of applying no policy is deployed. Regardless of whether a network policy is applied, the call quality manager 122 may generate a recording of the network event and store it in a storage element.

In yet another example and referring back to FIG. 2, a call may be initiated between communication units 114 and 120, and the communication units 114, 120 may send RTCP-XR stats to the call quality manager 122. In addition, a network alert from the signaling server (SS1) 118 may be generated in which the SNMP R-value score ("RV1") has a burst density greater than six percent, a network loss rate less than five percent and a discard rate greater than one percent. The call quality manager 122 can lookup the communication units 114, 120 from the RV1 and identify the OSI layer 2 ("L2") topology for the relevant network elements from the database and determine all the relevant interfaces along a call path. The call quality manager 122 can check the interface speed for all the relevant interfaces and identify those links with speeds (e.g., ifSpeed) less than 1 Mbps and display the ifSpeed & ifMTU for such links. The call quality manager 122 can identify all network devices connected to each of the low-speed links and locate the ipFragFails counter. If the ipFragFails counter is greater than zero, the call quality manager 122 may identify this fragmentation as the root cause of the congestion and suggest lowering the maximum transmission unit (MTU) on the link. On the other hand, if the fragmentation counter is zero, the call quality manager 122 may identify the low speed link as the root cause (and suggest replacement with a faster link). Once again, the call quality manager 122 may generate a recording of the network event and store it in a storage element.

In still yet another example and referring back to FIG. 1, a call may be initiated between communication units 114 and 120, and the communication units 114, 120 may send RTCP-XR stats/traps/alerts/etc. to the call quality manager 122. In addition, a network alert from the signaling server (SS1) 118 may be generated in which the SNMP R-value score ("RV1") has a burst density greater than one percent and a delay greater than three hundred milliseconds (300 ms). The call quality manager 122 can lookup the communication units 114, 120 from the RV1. The call quality manager 122 can request that a series of trace routes be executed on the signaling server 118, with a set run from unit 114 to unit 120, and a set run from unit 120 to unit 114. The call quality manager 122 can compare the results of the trace routes and if the results vary between the sets of trace route data, then the call quality manager 122 may identify the router where flapping is occurring as the root cause. In general, route flapping occurs when a router alternately advertises a destination network first via one route then another and it is caused by pathological conditions (hardware errors, software errors, configuration errors, unreliable connections, etc.) within the network, which cause certain reachability information to be repeatedly advertised and withdrawn. The most common causes of route flapping are configuration errors and intermittent errors in communications links. If, on the other hand, the results of the sets of traceroute data are the same, route flapping is either not an issue or has self-corrected itself and is no longer an issue.

The above examples are provided to illustrate a few of the various types of voice and video problems (e.g., delay, packet loss, jitter, echo and the like) found in IP communication networks and the various causes of these problems (e.g., network congestion due to network overuse/misuse and/or low-speed links, blocked IP packets due to firewalls and/or NAT, fast pipe to slow pipe, route flapping link failure and the like) which the call quality manager 122 of the current invention can troubleshoot and mitigate in communication networks.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general-purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. A variety of modifications and variations are possible in light of the above teachings without departing from the spirit or essential attributes thereof, and accordingly, reference should be had to the following claims, rather than to the foregoing specification, as indicating the scope of the of the invention.

What is claimed is:

1. A method for call quality troubleshooting and mitigation, the method comprising:
   polling physically separate network communication path elements and monitoring pathways between the elements to determine network performance data;
   receiving a call quality alert from at least one communication unit, the call quality alert including a simple network management protocol (SNMP) R-value score having a burst density greater than a first predetermined amount and a network loss rate greater than a second predetermined amount, and the at least one communication unit including at least one physical communication unit;
   in response to receiving the call quality alert, analyzing the network performance data from the network communication path elements and the at least one communication unit to determine a cause of the alert and at least one action to mitigate the cause of the alert; and
   capturing network conditions under which the alert was generated at the time of the call quality alert.

2. The method of claim 1, further comprising correlating the data from the network communication path elements with the data from the at least one communication unit.

3. The method of claim 2, further comprising invoking a real-time network topology investigation module to determine the cause of the call quality alert.

4. The method of claim 3, further comprising commencing a resolution phase to mitigate the cause of the alert.

5. The method of claim 4, wherein commencing a resolution phase includes applying a network policy on a network element.

6. The method of claim 1, wherein the first predetermined amount is substantially six percent and the second predetermined amount is substantially ten percent.

7. The method of claim 1, wherein the first predetermined amount is substantially six percent and the second predetermined amount is substantially five percent.

8. The method of claim 1, further comprising correlating the R-value score with a corresponding database pathtrace.

9. The method of claim 8, further comprising flagging a duplex mismatch along a path of the pathtrace as a possible cause of the alert.

10. An apparatus for call quality troubleshooting and mitigation, the apparatus comprising:
   a memory for storing data from network communication path elements and at least one communication unit; and
   a processor, the processor operating to:
   poll physically separate network communication path elements and monitor pathways between the elements to determine network performance data;
   store the network performance data in the memory;
   store a call quality alert received from at least one communication unit in the memory, the at least one communication unit including at least one physical communication unit, and the call quality alert including a simple network management protocol (SNMP) R-value score having a burst density greater than a first predetermined amount and a network loss rate greater than a second predetermined amount;
   in response to receiving the call quality alert, analyze the network performance data from the network communication path elements and the at least one communication unit to determine a cause of the alert and at least one action to mitigate the cause of the alert; and
   capturing network conditions under which the alert was generated at the time of the call quality alert.

11. The apparatus of claim 10, the processor further operating to correlate the data from the network communication path elements with the data from the at least one communication unit.

12. The apparatus of claim 11, the processor further operating to invoke a real-time network topology investigation module to determine the cause of the call quality alert.

13. The apparatus of claim 12, the processor further operating to commence a resolution phase to mitigate the cause of the alert.

14. The apparatus of claim 13, wherein operating to commence a resolution phase includes applying a network policy on a network element.

15. The apparatus of claim 10, wherein the call quality alert includes a discard rate less than a third predetermined amount.

16. The apparatus of claim 15, wherein the third predetermined amount is less than substantially one percent.

17. The apparatus of claim 10, wherein the processor further correlates the R-value score with a corresponding database pathtrace.

18. A non-transitory, computer readable storage medium storing a computer program which when executed by a processing unit performs a method for call quality troubleshooting and mitigation, the method comprising:
   polling physically separate network communication path elements and monitoring pathways between the elements to determine network performance data;
   receiving a call quality alert from at least one communication unit, the call quality alert including a simple network management protocol (SNMP) R-value score having a burst density greater than a first predetermined amount and a network loss rate greater than a second predetermined amount, and the at least one communication unit including at least one physical communication unit;
   in response to receiving the call quality alert, analyzing the network performance data from the network communication path elements and the at least one communication unit to determine a cause of the alert and at least one action to mitigate the cause of the alert; and
   capturing network conditions under which the alert was generated at the time of the call quality alert.

19. The storage medium of claim 18, wherein the method further comprises correlating the data from the network communication path elements with the data from the at least one communication unit.

20. The storage medium of claim 19, wherein the method further comprises invoking a real-time network topology investigation module to determine the cause of the call quality alert.

21. The storage medium of claim 20, wherein the method further comprises commencing a resolution phase to mitigate the cause of the alert.

22. The storage medium of claim 21, wherein commencing a resolution phase includes applying a network policy on a network element.

23. The storage medium of claim 18, wherein the first predetermined amount is substantially six percent and the second predetermined amount is substantially ten percent.

* * * * *

UNITED STATES PATENT AND TRADEMARK OFFICE
CERTIFICATE OF CORRECTION

| | | |
|---|---|---|
| PATENT NO. | : 8,284,675 B2 | Page 1 of 1 |
| APPLICATION NO. | : 11/476299 | |
| DATED | : October 9, 2012 | |
| INVENTOR(S) | : Zubair Ansari et al. | |

It is certified that error appears in the above-identified patent and that said Letters Patent is hereby corrected as shown below:

In Column 6, line 44-45, replace "correactions" with --corrections--.

Signed and Sealed this
Fourth Day of December, 2012

David J. Kappos
*Director of the United States Patent and Trademark Office*